(12) United States Patent
Bianchini, Jr. et al.

(10) Patent No.: US 6,473,433 B1
(45) Date of Patent: Oct. 29, 2002

(54) QUEUE RESYNCH: SYNCHRONOUS REAL-TIME UPGRADE OF A DISTRIBUTED SWITCHING SYSTEM

(75) Inventors: Ronald P. Bianchini, Jr., Pittsburgh; Jeff Schulz, Valencia; Veera Reddy, Wexford; Joseph A. Hook, Baden, all of PA (US)

(73) Assignee: Marconi Communications, Inc., Warrendale, PA (US)

( * ) Notice: Subject to any disclaimer, the term of this patent is extended or adjusted under 35 U.S.C. 154(b) by 99 days.

(21) Appl. No.: 09/609,497

(22) Filed: Jun. 30, 2000

(51) Int. Cl.[7] .................... H04L 12/28; H04L 12/56; H04J 3/06
(52) U.S. Cl. .................... 370/412; 370/429; 370/503
(58) Field of Search .................. 370/389, 412, 370/413, 414, 415, 416, 417, 418, 419, 429, 503, 509, 510, 511, 512

*Primary Examiner*—Alpus H. Hsu
*Assistant Examiner*—Thien D Tran
(74) *Attorney, Agent, or Firm*—Angel M. Schwartz (57) ABSTRACT

A switch of a network connected to a switch control processor. The switch includes port cards which receive packets from and send packets to the network. The switch comprises a switch control processor for providing control information. The switch includes fabrics for switching the packets. The fabrics receive control information from the switch control processor but all the fabrics only implement the control information at a same logical time when each fabric receives a control initiation signal from one of the port cards. Each respective fabric continuously operating on packets before, during and after each respective fabric receives the control initiation signal. A method for switching packets. The method includes the steps of receiving packets at a port card of a switch from a network. Then there is the step of sending fragments of each packet to fabrics of the switch. Then there is the step of distributing control information from a switch control processor to the fabrics of the switch as the port card continues to receive packets. Next there is the step of receiving a control initiation signal from a switch control processor through the network at the port card. Then there is the step of sending the control initiation signal from the port card to the fabrics. Next there is the step of implementing the control information at each fabric only after the respective fabric receives the control initiation signal so all the fabrics implement the control information at the same time.

17 Claims, 8 Drawing Sheets

QUEUE RESYNCH: SYNCHRONOUS REAL-TIME UPGRADE OF A DISTRIBUTED SWITCHING SYSTEM

FIELD OF THE INVENTION

The present invention is related to upgrading synchronously in real-time a distributed switching system without turning off traffic. More specifically, the present invention is related to upgrading synchronously in real-time a distributed switching system without turning off traffic by sending a queue resynch signal and making all switching elements act on this signal at the same logical time when this signal is received.

BACKGROUND OF THE INVENTION

In a distributed switching system where multiple switching elements are processing a portion of each packet, all the switching elements have to be synchronous, i.e. executing same steps at the same logical time. This is especially relevant if packets could be dropped due to, for instance, temporary overbooking of available resources. Ordinarily, during a system upgrade where new switching elements are added or system control information need to be updated synchronously in all switching elements, all the traffic is turned off until the upgrade is complete. This is a problem in critical systems where the traffic cannot be turned off for long period. A switch which stripes data onto multiple fabrics and sends parity data to another fabric has been described in U.S. patent application Ser. No. 09/333,450, incorporated by reference herein. See also U.S. patent application Ser. No. 09/293,563 which describes a wide memory TDM switching system, incorporated by reference herein.

SUMMARY OF THE INVENTION

The present invention pertains to a switch of a network. The switch comprises port cards which receive packets from and send packets to the network. The switch comprises a switch control processor for providing control information. The switch comprises fabrics (or switching elements) for switching the packets. The fabrics receive control information from the switch control processor but all the fabrics only implement the control information at a same logical time when each fabric receives a control initiation signal from one of the port cards. Each respective fabric continuously operating on packets before, during and after each respective fabric receives the control initiation signal.

The present invention pertains to a method for switching packets. The method comprises the steps of receiving packets at a port card of a switch from a network. Then there is the step of sending fragments of each packet to fabrics of the switch. Then there is the step of distributing control information from a processor to the fabrics of the switch as the port card continues to receive packets. Next there is the step of receiving a control initiation signal from the switch control processor through the network at the port card. Then there is the step of sending the control initiation signal from the port card to the fabrics. Next there is the step of implementing the control information at each fabric only after the respective fabric receives the control initiation signal so all the fabrics implement the control information at the same time.

BRIEF DESCRIPTION OF THE DRAWINGS

In the accompanying drawings, the preferred embodiment of the invention and preferred methods of practicing the invention are illustrated in which.

DETAILED DESCRIPTION

Figure 7:
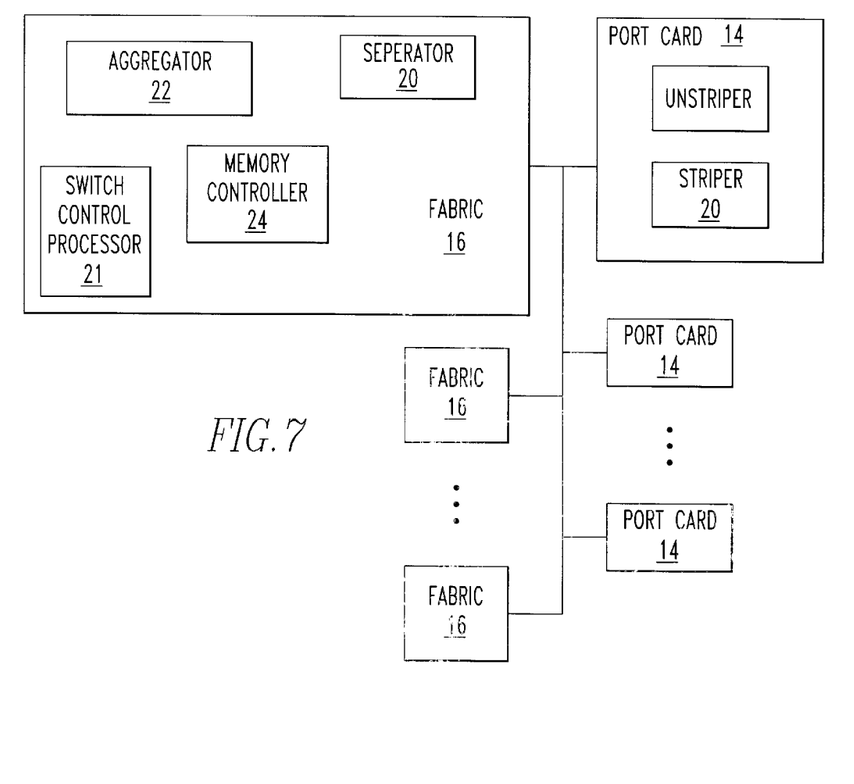
FIG. 7 is a schematic representation of a switch of the present invention.

Referring now to the drawings wherein like reference numerals refer to similar or identical parts throughout the several views, and more specifically to figure 7 thereof, there is shown a switch 10 of a network 12 connected to a switch control processor 18. The switch 10 comprises port cards 14 which receive packets from and send packets to the network 12. The switch comprises a switch control processor 21 for providing control information. The switch 10 comprises fabrics 16 for switching the packets. The fabrics 16 receive control information from the switch control processor 18 but all the fabrics 16 only implement the control information at a same logical time when each fabric receives a control initiation signal from one of the port cards 14. Each respective fabric continuously operating on packets before, during and after each respective fabric receives the control initiation signal, the fabrics connected to the switch control processor and the port cards.

Preferably, each port card 14 includes a striper 20 which sends to each fabric a respective portion of each packet. All the fabrics 16 preferably are in sync with each other. Preferably, each fabric has an aggregator 22 which receives the packet fragments from the striper 20, a memory controller 24 in which the packet fragments received by the aggregator 22 are stored, and a separator 26 which sends the packet fragments in the memory controller 24 to the port card 14.

Each fabric preferably becomes in sync with all the other fabrics 16 after the control initiation signal is received by bringing the aggregator 22, then the memory controller 24 and next the separator 26 of each fabric, respectively, in sync. Preferably, the control initiation signal is sent in a queue resynch packet. Each fabric preferably enters a queue resynch state where all packet fragments received by the fabric before the queue resynch state is entered by the fabrics 16 are dequeued, and any packet fragments received by the fabric after the queue resynch state is entered are dequeued only after a prespecified queue resynch time has elapsed.

The present invention pertains to a method for switching packets. The method comprises the steps of receiving packets at a port card 14 of a switch 10 from a network 12. Then there is the step of sending fragments of each packet to fabrics 16 of the switch 10. Then there is the step of distributing control information from a switch control processor 21 to the fabrics 16 of the switch 10 as the port card 14 continues to receive packets. Next there is the step of receiving a control initiation signal from the switch control processor 18 through the network 12 at the port card 14. Then there is the step of sending the control initiation signal from the port card 14 to the fabrics 16. Next there is the step of implementing the control information at each fabric only after the respective fabric receives the control initiation signal so all the fabrics 16 implement the control information at the same time.

Preferably, the implementing step includes the step of entering a queue resynch state by each fabric when the respective fabric implements the control information. After the entering step, there is preferably the step of dequeueing any packet fragments received by the fabric before any new packet fragments received by the fabric after the fabric has entered the resynch state are dequeued.

Preferably, the dequeueing step includes the step of dequeueing any new packets only after a prespecified queue resynch time has passed or the new packet fragments received exceed a preset queue resynch threshold of packet fragments. Before the receiving control information step, there is preferably the step of adding a new fabric to the fabrics 16 of the switch 10; and the receiving the control information step includes the step of receiving the control information which includes information regarding initiation of the new fabric.

Preferably, the sending fragments of the packets step includes the step of sending fragments of the packets with a striper 20 of the port card 14 to an aggregator 22 of each fabric. The entering step preferably includes the step of bringing in sync the aggregator 22, then a memory controller 24 and next a separator 26 of each fabric, respectively. Preferably, the receiving control initiation signal step includes the step of receiving a queue resynch packet having the control initiation signal, which is inserted with other packets being sent.

In the operation of the invention, in BFS as each fabric handles a portion of each packet, all fabrics 16 need to be in Synch (executing same operations at the same logical time, and in the same Queue state) in order for all of them to make same packet enqueue and dequeue decisions; which guarantees that whole packet is either accepted or dropped, and packet segments are dequeued in the same order, across all fabrics 16. A globally distributed Synch pulse will provide logical reference time for all fabrics 16.

If one or more new fabrics 16 are added while some of the fabrics 16 are up and running and traffic is flowing through them, the new fabric(s) may not be in Synch with the previously existing fabrics 16 as they may have different Queue depths and their state machines could be in different states compared to previously existing fabrics 16. Until the newly added fabric(s) are brought in synch (i.e. same Queue depths, and state machine states) with the other fabrics 16, the new fabrics 16 are carrying useless information, which is not used by destination port cards 14. Only after the new fabric(s) are brought in Synch with the old fabrics 16, can they carry useful traffic. To bring the newly added fabric(s) in Synch with the old fabrics 16, the queue depths and state of some of the internal state machines of these new fabric(s) should be made same as old fabrics 16.

To do this, a special packet called Queue Resynch packet is sent from one of the switch control processors 18 to all the fabrics 16. On receiving this packet all fabrics 16 will recognize this as Queue Resynch event at the same logical time, and will enter a Queue Resynch state where they will dequeue all the old packets (packets that were received before Queue Resynch event) and will dequeue the new packets (packets that were received after Queue Resynch event) only after a pre-specified Queue Resynch Time has elapsed and from a pre-specified queue. Queue Resynch Time is set to be long enough to drain all the old packets, but short enough to avoid dropping of new packets. If more new packets were to arrive than can be enqueued before the Queue Resynch Time elapses, space is made for new packets in the buffer by dropping old packets. Also, if the new packet count exceeds a preset threshold, called Queue Resynch Threshold, then also Queue Resynch state is exited. In either case, where Queue Resynch state is exited either due to exceeding Queue Resynch Time or exceeding Queue Resynch Threshold, any old packets that were still left in the buffer are released to free buffer. This guarantees that at the end of Queue Resynch state, all the fabric Queues and state machines are in the same state, and the fabrics 16 are enqueueing and dequeueing same packets in the same order.

In BFS to make a fabric get in Synch with other fabrics 16, Aggregators, Memory Controllers, and Separators all on the new fabric(s) should be brought in Synch with the corresponding elements on the old fabrics 16. This is achieved by executing Queue Resynch steps in one element and then following onto the next one in the same direction as the data flow. This is called Propagated Queue Resynch.

Also Queue Resynch can be used, if some system control information needs to be updated synchronously on multiple fabrics 16. Assuming that fabrics 16 are already in Synch, first update the control information in each fabric independently, but don't make the change effective yet. Then by executing Queue Resynch process or a version of it, make the updated control information effective at the end of Queue Resynch process. Since, this event happens at the same logical clock cycle in all fabrics 16 they all will see the updated control information at the same logical step.

This approach has minimal overhead. There should be some amount of extra bandwidth to send the Queue Resynch Packet itself. This extra bandwidth requirement is negligible as this packet need be sent only when the system configuration changes, and the Queue Resynch packet can be minimum length packet. Also, the data path FIFOs that need to be brought to a synchronous state across multiple fabrics 16 has to be deeper than normal in order that in all fabrics 16, these FIFOs send out old packets before any fabrics 16 read new packets from these FIFOs. In BFS, Aggregator FIFOs had to be ⅓rd deeper than normal to support Queue Resynch. Even with these incremental overheads, Queue Resynch is a big benefit as it provides a real-time synchronous update of a distributed switching system.

Instead of turning off the traffic during the system upgrade, the upgrade is executed in real-time. By sending the Queue Resynch (i.e. system upgrade) information to all switching elements in-line with the data traffic from one of the input switch control processors 18, and by making all switching elements act on this information at the same logical time, the upgrade will be completed and any new switching elements that were added and were out of synch with others will be made synchronous. The same approach can be used for upgrading any system control information synchronously in all switching elements.

The switch uses RAID techniques to increase overall switch bandwidth while minimizing individual fabric bandwidth. In the switch architecture, all data is distributed evenly across all fabrics so the switch adds bandwidth by adding fabrics and the fabric need not increase its bandwidth capacity as the switch increases bandwidth capacity.

Each fabric provides 40 G of switching bandwidth and the system supports 1, 2, 3, 4, 6, or 12 fabrics, exclusive of the redundant/spare fabric. In other words, the switch can be a 40 G, 80 G, 120 G, 160 G, 240 G, or 480 G switch depending on how many fabrics are installed.

A portcard provides 10 G of port bandwidth. For every 4 portcards, there needs to be 1 fabric. The switch architecture does not support arbitrary installations of portcards and fabrics.

The fabric ASICs support both cells and packets. As a whole, the switch takes a "receiver make right" approach where the egress path on ATM blades must segment frames to cells and the egress path on frame blades must perform reassembly of cells into packets.

There are currently eight switch ASICs that are used in the switch:

1. Striper—The Striper resides on the portcard and SCP-IM. It formats the data into a 12 bit data stream, appends a checkword, splits the data stream across the N, non-spare fabrics in the system, generates a parity stripe of width equal to the stripes going to the other fabric, and sends the N+1 data streams out to the backplane.
2. Unstriper—The Unstriper is the other portcard ASIC in the switch architecture. It receives data stripes from all the fabrics in the system. It then reconstructs the original data stream using the checkword and parity stripe to perform error detection and correction.
3. Aggregator—The Aggregator takes the data streams and routewords from the Stripers and multiplexes them into a single input stream to the Memory Controller.
4. Memory Controller—The Memory controller implements the queueing and dequeueing mechanisms of the switch. This includes the proprietary wide memory interface to achieve the simultaneous en-/de-queueing of multiple cells of data per clock cycle. The dequeueing side of the Memory Controller runs at 80 Gbps compared to 40 Gbps in order to make the bulk of the queueing and shaping of connections occur on the portcards.
5. Separator—The Separator implements the inverse operation of the Aggregator. The data stream from the Memory Controller is demultiplexed into multiple streams of data and forwarded to the appropriate Unstriper ASIC. Included in the interface to the Unstriper is a queue and flow control handshaking.

There are 3 different views one can take of the connections between the fabric: physical, logical, and "active." Physically, the connections between the portcards and the fabrics are all gigabit speed differential pair serial links. This is strictly an implementation issue to reduce the number of signals going over the backplane. The "active" perspective looks at a single switch configuration, or it may be thought of as a snapshot of how data is being processed at a given moment. The interface between the fabric ASIC on the portcards and the fabrics is effectively 12 bits wide. Those 12 bits are evenly distributed ("striped") across 1, 2, 3, 4, 6, or 12 fabrics based on how the fabric ASICs are configured. The "active" perspective refers to the number of bits being processed by each fabric in the current configuration which is exactly 12 divided by the number of fabrics.

Figure 4A:
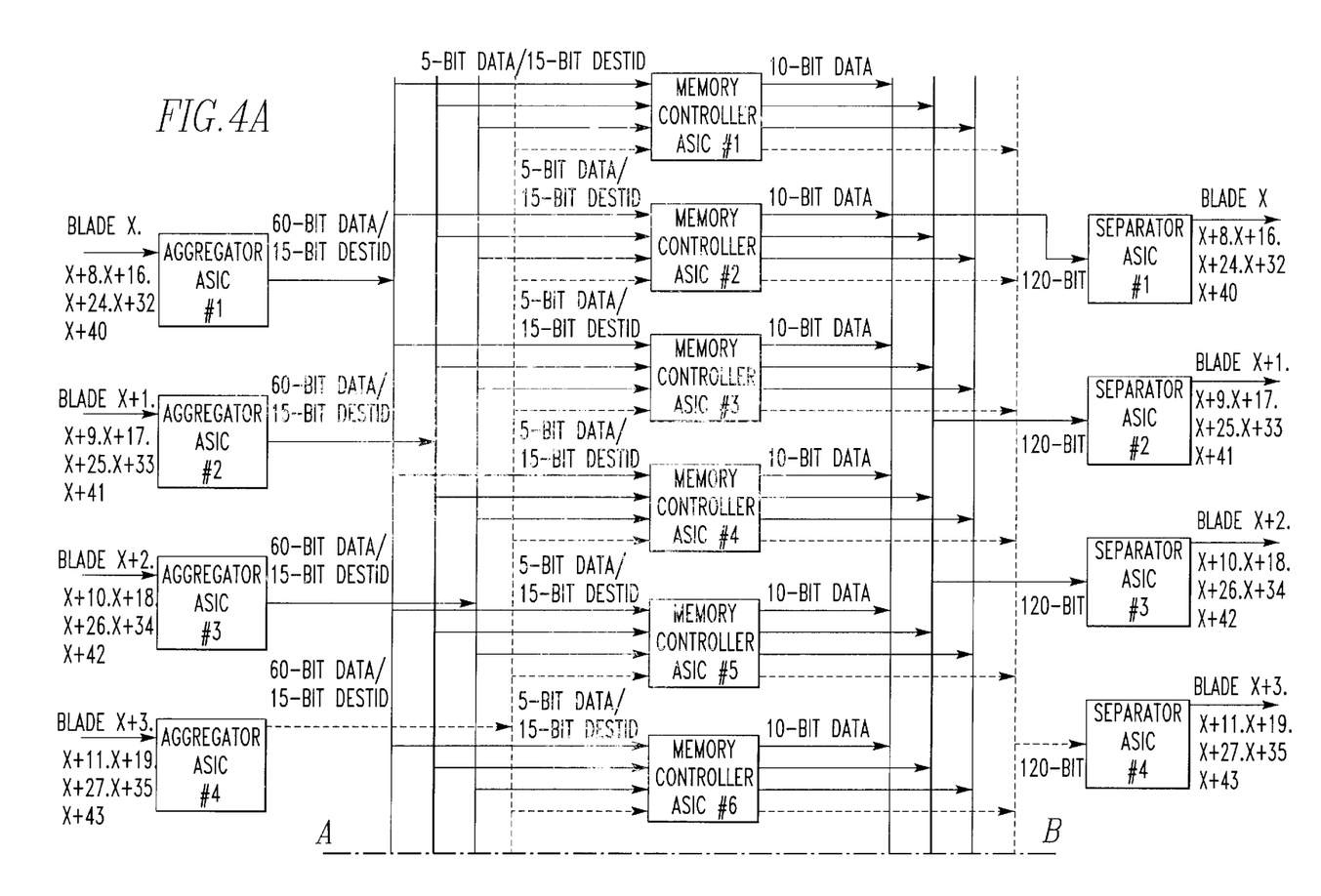
FIGS. 4a and 4b are schematic representations regarding the connectivity of the fabric ASICs.
Figure 4B:
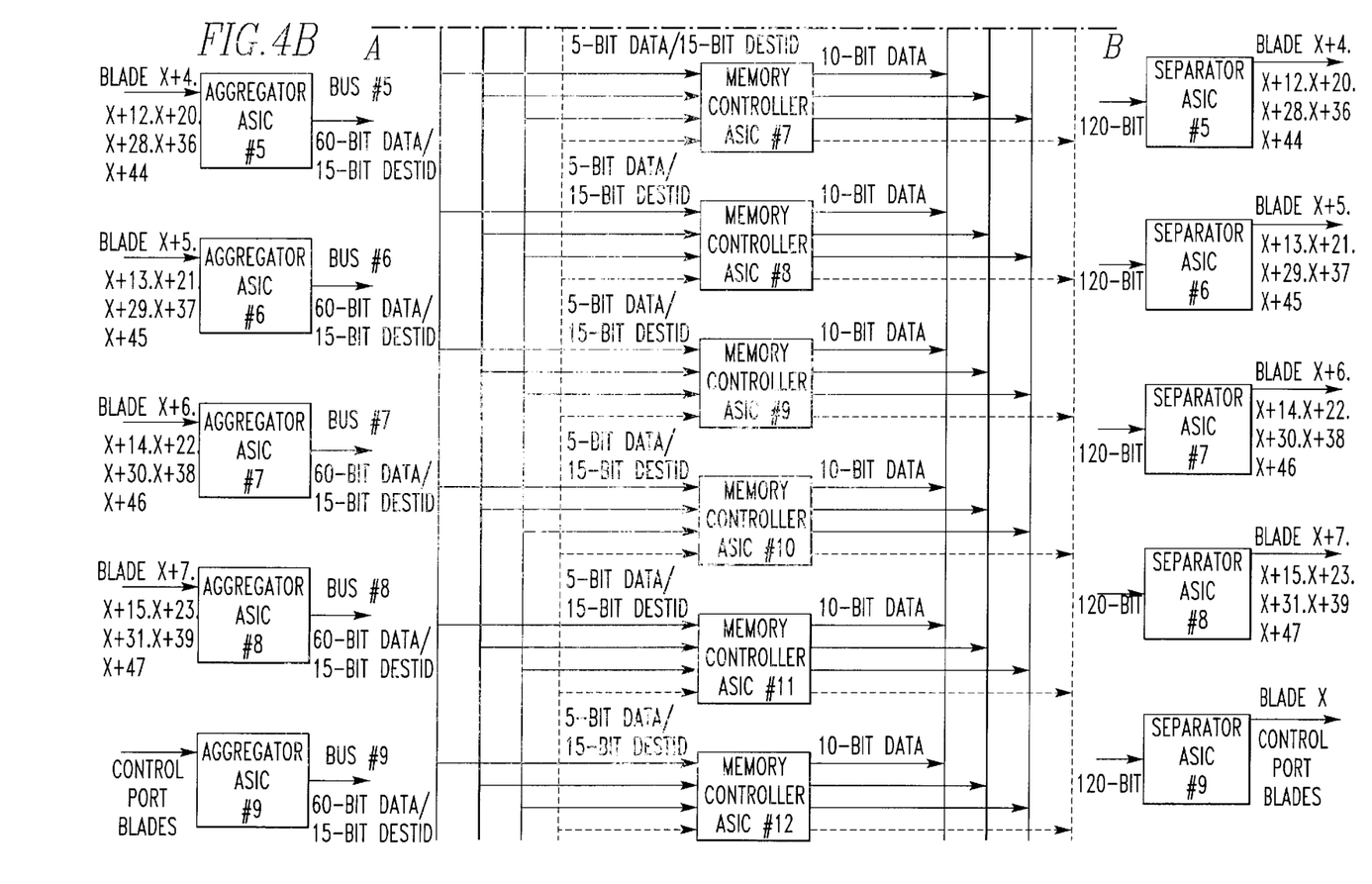

The logical perspective can be viewed as the union or max function of all the possible active configurations. Fabric slot #1 can, depending on configuration, be processing 12, 6, 4, 3, 2, or 1 bits of the data from a single Striper and is therefore drawn with a 12 bit bus. In contrast, fabric slot #3 can only be used to process 4, 3, 2, or 1 bits from a single Striper and is therefore drawn with a 4 bit bus.

Unlike previous switches, the switch really doesn't have a concept of a software controllable fabric redundancy mode. The fabric ASICs implement N+1 redundancy without any intervention as long as the spare fabric is installed.

As far as what does it provide; N+1 redundancy means that the hardware will automatically detect and correct a single failure without the loss of any data.

The way the redundancy works is fairly simple, but to make it even simpler to understand a specific case of a 120 G switch is used which has 3 fabrics (A, B, and C) plus a spare (S). The Striper takes the 12 bit bus and first generates a checkword which gets appended to the data unit (cell or frame). The data unit and checkword are then split into a 4-bit-per-clock-cycle data stripe for each of the A, B, and C fabrics ($A_3A_2A_1A_0$, $B_3B_2B_1B_0$, and $C_3C_2C_1C_0$). These stripes are then used to produce the stripe for the spare fabric $S_3S_2S_1S_0$ where $S_n = A_n$ XOR $B_n$ XOR $C_n$ and these 4 stripes are sent to their corresponding fabrics. On the other side of the fabrics, the Unstriper receives 4 4-bit stripes from A, B, C, and S. All possible combinations of 3 fabrics (ABC, ABS, ASC, and SBC) are then used to reconstruct a "tentative" 12-bit data stream. A checkword is then calculated for each of the 4 tentative streams and the calculated checkword compared to the checkword at the end of the data unit. If no error occurred in transit, then all 4 streams will have checkword matches and the ABC stream will be forwarded to the Unstriper output. If a (single) error occurred, only one checkword match will exist and the stream with the match will be forwarded off chip and the Unstriper will identify the faulty fabric stripe.

For different switch configurations, i.e. 1, 2, 4, 6, or 12 fabrics, the algorithm is the same but the stripe width changes.

If 2 fabrics fail, all data running through the switch will almost certainly be corrupted.

The fabric slots are numbered and must be populated in ascending order. Also, the spare fabric is a specific slot so populating fabric slots 1, 2, 3, and 4 is different than populating fabric slots 1, 2, 3, and the spare. The former is a 160 G switch without redundancy and the latter is 120 G with redundancy.

Firstly, the ASICs are constructed and the backplane connected such that the use of a certain portcard slots requires there to be at least a certain minimum number of fabrics installed, not including the spare. This relationship is shown in Table 0.

In addition, the APS redundancy within the switch is limited to specifically paired portcards. Portcards 1 and 2 are paired, 3 and 4 are paired, and so on through portcards 47 and 48. This means that if APS redundancy is required, the paired slots must be populated together.

To give a simple example, take a configuration with 2 portcards and only 1 fabric. If the user does not want to use APS redundancy, then the 2 portcards can be installed in any two of portcard slots 1 through 4. If APS redundancy is desired, then the two portcards must be installed either in slots 1 and 2 or slots 3 and 4.

TABLE 0

| Fabric Requirements for Postcard Slot Usage | |
|---|---|
| Portcard Slot | Minimum # of Fabrics |
| 1–4 | 1 |
| 5–8 | 2 |
| 9–12 | 3 |
| 13–16 | 4 |

TABLE 0-continued

Fabric Requirements for Postcard Slot Usage

| Portcard Slot | Minimum # of Fabrics |
|---|---|
| 17–24 | 6 |
| 25–48 | 12 |

To add capacity, add the new fabric(s), wait for the switch to recognize the change and reconfigure the system to stripe across the new number of fabrics. Install the new portcards.

Note that it is not technically necessary to have the full 4 portcards per fabric. The switch will work properly with 3 fabrics installed and a single portcard in slot 12. This isn't cost efficient but it will work.

To remove capacity, reverse the adding capacity procedure.

If the switch is oversubscribed, i.e. install 8 portcards and only one fabric.

It should only come about as the result of improperly upgrading the switch or a system failure of some sort. The reality is that one of two things will occur, depending on how this situation arises. If the switch is configured as a 40 G switch and the portcards are added before the fabric, then the $5^{th}$ through $8^{th}$ portcards will be dead. If the switch is configured as 80 G non-redundant switch and the second fabric fails or is removed then all data through the switch will be corrupted (assuming the spare fabric is not installed). And just to be complete, if 8 portcards were installed in an 80 G redundant switch and the second fabric failed or was removed, then the switch would continue to operate normally with the spare covering for the failed/removed fabric.

Figure 1:
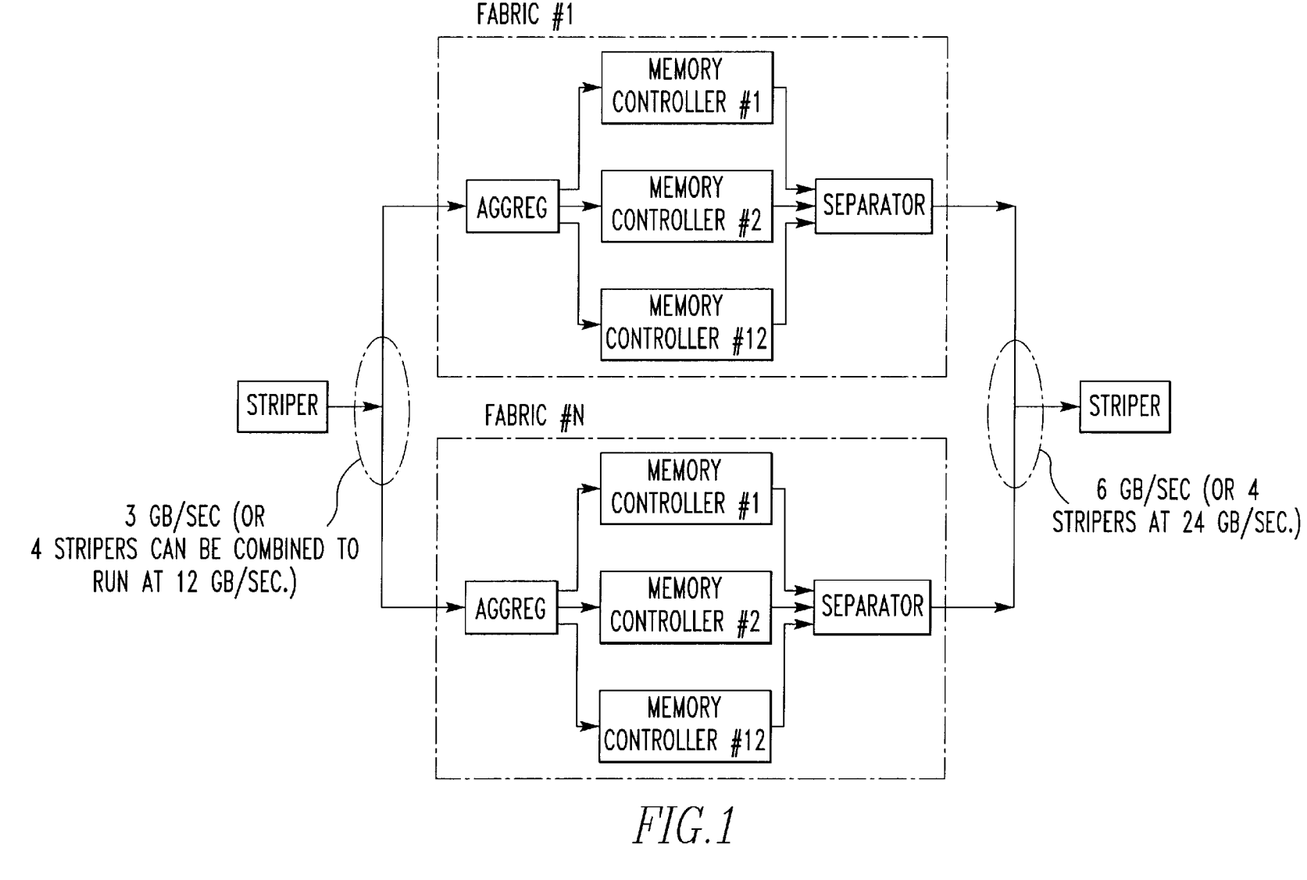
FIG. 1 is a schematic representation of packet striping in the switch of the present invention.

FIG. 1 shows packet striping in the switch.

The chipset supports ATM and POS port cards in both OC48 and OC192c configurations. OC48 port cards interface to the switching fabrics with four separate OC48 flows. OC192 port cards logically combine the 4 channels into a 10 G stream. The ingress side of a port card does not perform traffic conversions for traffic changing between ATM cells and packets. Whichever form of traffic is received is sent to the switch fabrics. The switch fabrics will mix packets and cells and then dequeue a mix of packets and cells to the egress side of a port card.

The egress side of the port is responsible for converting the traffic to the appropriate format for the output port. This convention is referred to in the context of the switch as "receiver makes right". A cell blade is responsible for segmentation of packets and a cell blade is responsible for reassembly of cells into packets. To support fabric speed-up, the egress side of the port card supports a link bandwidth equal to twice the inbound side of the port card.

Figure 2:
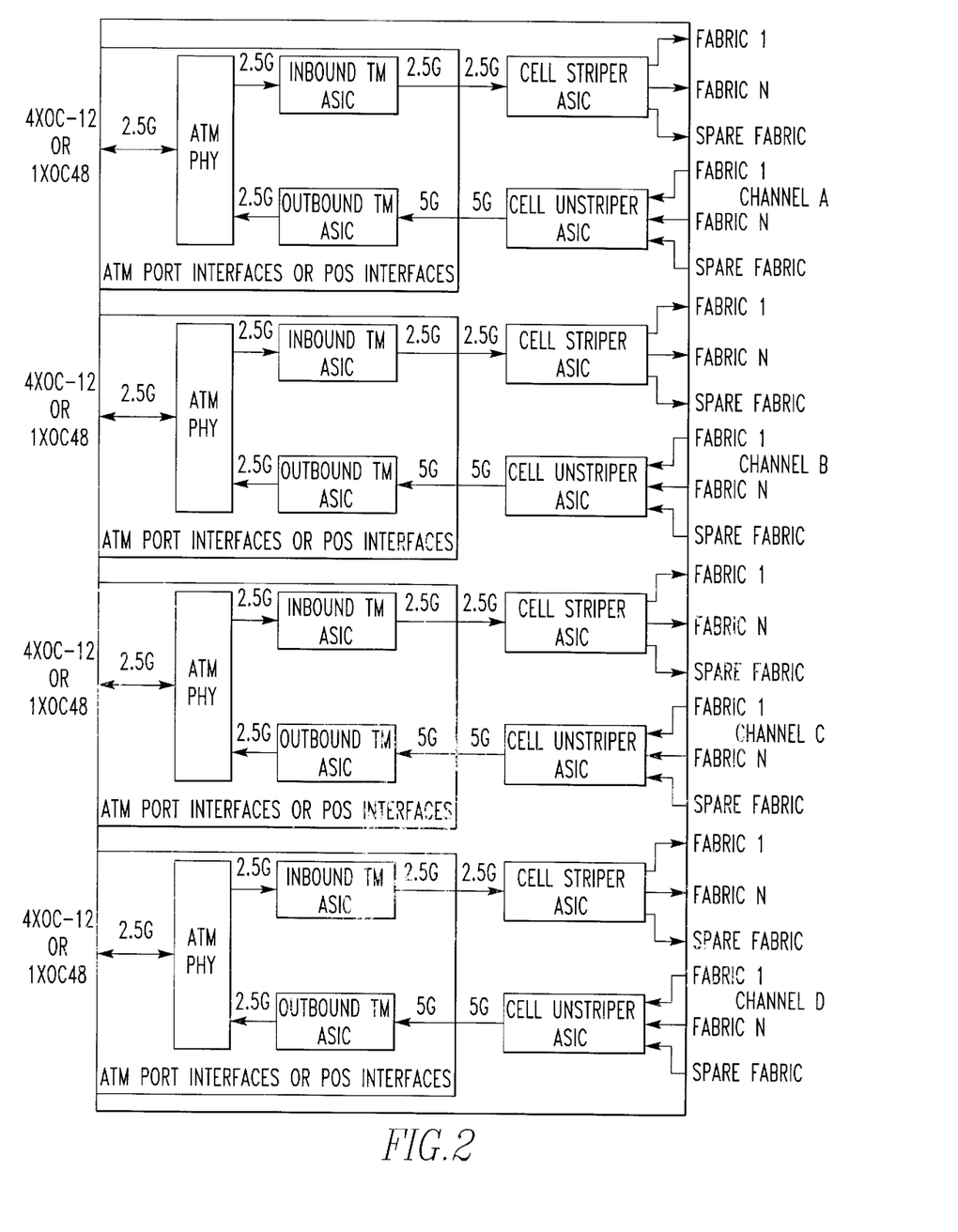
FIG. 2 is a schematic representation of an OC 48 port card.

The block diagram for a Poseidon-based ATM port card is shown as in FIG. 2. Each 2.5 G channel consists of 4 ASICs: Inbound ™ and striper ASIC at the inbound side and unstriper ASIC and outbound TM ASIC at the outbound side.

At the inbound side, OC-48c or 4 OC-12c interfaces are aggregated. Each vortex sends a 2.5 G cell stream into a dedicated striper ASIC (using the BIB bus, as described below). The striper converts the supplied routeword into two pieces. A portion of the routeword is passed to the fabric to determine the output port(s) for the cell. The entire routeword is also passed on the data portion of the bus as a routeword for use by the outbound memory controller. The first routeword is termed the "fabric routeword". The routeword for the outbound memory controller is the "egress routeword".

At the outbound side, the unstriper ASIC in each channel takes traffic from each of the port cards, error checks and correct the data and then sends correct packets out on its output bus. The unstriper uses the data from the spare fabric and the checksum inserted by the striper to detect and correct data corruption.

FIG. 2 shows an OC48 Port Card.

Figure 3:
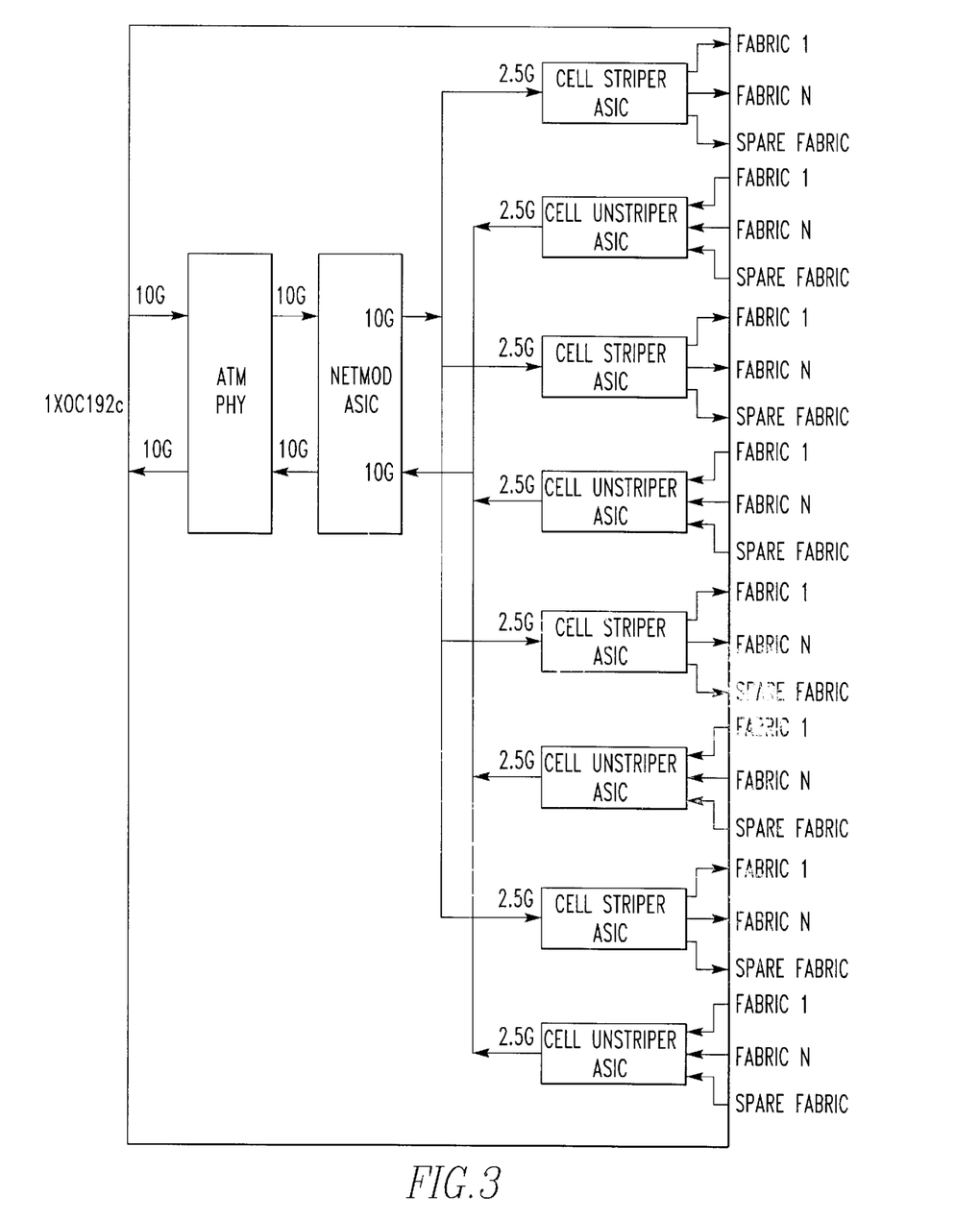
FIG. 3 is a schematic representation of a concatenated network blade.

The OC192 port card supports a single 10 G stream to the fabric and between a 10 G and 20 G egress stream. This board also uses 4 stripers and 4 unstriper, but the 4 chips operate in parallel on a wider data bus. The data sent to each fabric is identical for both OC48 and OC192 ports so data can flow between the port types without needing special conversion functions.

FIG. 3 shows a 10 G concatenated network blade.

Each 40 G switch fabric enqueues up to 40 Gbps cells/frames and dequeue them at 80 Gbps. This 2× speed-up reduces the amount of traffic buffered at the fabric and lets the outbound ASIC digest bursts of traffic well above line rate. A switch fabric consists of three kinds of ASICs: aggregators, memory controllers, and separators. Nine aggregator ASICs receive 40 Gbps of traffic from up to 48 network blades and the control port. The aggregator ASICs combine the fabric route word and payload into a single data stream and TDM between its sources and places the resulting data on a wide output bus. An additional control bus (destid) is used to control how the memory controllers enqueue the data. The data stream from each aggregator ASIC then bit sliced into 12 memory controllers.

The memory controller receives up to 16 cells/frames every clock cycle. Each of 12 ASICs stores $1/12$ of the aggregated data streams. It then stores the incoming data based on control information received on the destid bus. Storage of data is simplified in the memory controller to be relatively unaware of packet boundaries (cache line concept) All 12 ASICs dequeue the stored cells simultaneously at aggregated speed of 80 Gbps.

Nine separator ASICs perform the reverse function of the aggregator ASICs. Each separator receives data from all 12 memory controllers and decodes the routewords embedded in the data streams by the aggregator to find packet boundaries Each separator ASIC then sends the data to up to 24 different unstripers depending on the exact destination indicated by the memory controller as data was being passed to the separator.

The dequeue process is back-pressure driven. If back-pressure is applied to the unstriper, that back-pressure is communicated back to the separator. The separator and memory controllers also have a back-pressure mechanism which controls when a memory controller can dequeue traffic to an output port.

In order to support OC48 and OC192 efficiently in the chipset, the 4 OC48 ports from one port card are always routed to the same aggregator and from the same separator (the port connections for the aggregator & Sep are always symmetric).

FIGS. 4a and 4b show the connectivity of the fabric ASICs.

The external interfaces of the switches are the Input Bus (BIB) between the striper ASIC and the ingress blade ASIC such as Vortex and the Output Bus (BOB) between the unstriper ASIC and the egress blade ASIC such as Trident.

The Striper ASIC accepts data from the ingress port via the Input Bus (BIB) (also known as DIN_ST_bl_ch bus).

This bus can either operate as 4 separate 32 bit input busses (4×OC48c) or a single 128 bit wide data bus with a common set of control lines to all stripers. This bus supports either cells or packets based on software configuration of the striper chip.

The unstriper ASIC sends data to the egress port via Output Bus (BOB) (also known as DOUT_UN_bl_ch bus), which is a 64 (or 256) bit data bus that can support either cell or packet. It consists of the following signals:

This bus can either operate as 4 separate 32 bit output busses (4×OC48c) or a single 128 bit wide data bus with a common set of control lines from all Unstripers. This bus supports either cells or packets based on software configuration of the unstriper chip.

The Synchronizer has two main purposes. The first purpose is to maintain logical cell/packet or datagram ordering across all fabrics. On the fabric ingress interface, datagrams arriving at more than one fabric from one port card's channels need to be processed in the same order across all fabrics. The Synchronizer's second purpose is to have a port card's egress channel re-assemble all segments or stripes of a datagram that belong together even though the datagram segments are being sent from more than one fabric and can arrive at the blade's egress inputs at different times. This mechanism needs to be maintained in a system that will have different net delays and varying amounts of clock drift between blades and fabrics.

The switch uses a system of a synchronized windows where start information is transmit around the system. Each transmitter and receiver can look at relative clock counts from the last resynch indication to synchronize data from multiple sources. The receiver will delay the receipt of data which is the first clock cycle of data in a synch period until a programmable delay after it receives the global synch indication. At this point, all data is considered to have been received simultaneously and fixed ordering is applied. Even though the delays for packet 0 and cell 0 caused them to be seen at the receivers in different orders due to delays through the box, the resulting ordering of both streams at receive time=1 is the same, Packet 0, Cell 0 based on the physical bus from which they were received.

Multiple cells or packets can be sent in one counter tick. All destinations will order all cells from the first interface before moving onto the second interface and so on. This cell synchronization technique is used on all cell interfaces. Differing resolutions are required on some interfaces.

The Synchronizer consists of two main blocks, mainly, the transmitter and receiver. The transmitter block will reside in the Striper and Separator ASICs and the receiver block will reside in the Aggregator and Unstriper ASICs. The receiver in the Aggregator will handle up to 24(6 port cards×4 channels) input lanes. The receiver in the Unstriper will handle up to 13 (12 fabrics +1 parity fabric) input lanes.

When a sync pulse is received, the transmitter first calculates the number of clock cycles it is fast (denoted as N clocks).

The transmit synchronizer will interrupt the output stream and transmit N K characters indicating it is locking down. At the end of the lockdown sequence, the transmitter transmits a K character indicating that valid data will start on the next clock cycle. This next cycle valid indication is used by the receivers to synchronize traffic from all sources.

At the next end of transfer, the transmitter will then insert at least one idle on the interface. These idles allow the 10 bit decoders to correctly resynchronize to the 10 bit serial code window if they fall out of synch.

The receive synchronizer receives the global synch pulse and delays the synch pulse by a programmed number (which is programmed based on the maximum amount of transport delay a physical box can have). After delaying the synch pulse, the receiver will then consider the clock cycle immediately after the synch character to be eligible to be received. Data is then received every clock cycle until the next synch character is seen on the input stream. This data is not considered to be eligible for receipt until the delayed global synch pulse is seen.

Since transmitters and receivers will be on different physical boards and clocked by different oscillators, clock speed differences will exist between them. To bound the number of clock cycles between different transmitters and receivers, a global sync pulse is used at the system level to resynchronize all sequence counters. Each chip is programmed to ensure that under all valid clock skews, each transmitter and receiver will think that it is fast by at least one clock cycle. Each chip then waits for the appropriate number of clock cycles they are into their current sync_pulse_window. This ensure that all sources run N* sync_pulse_window valid clock cycles between synch pulses.

As an example, the synch pulse window could be programmed to 100 clocks, and the synch pulses sent out at a nominal rate of a synch pulse every 10,000 clocks. Based on a worst case drifts for both the synch pulse transmitter clocks and the synch pulse receiver clocks, there may actually be 9,995 to 10,005 clocks at the receiver for 10,000 clocks on the synch pulse transmitter. In this case, the synch pulse transmitter would be programmed to send out synch pulses every 10,006 clock cycles. The 10,006 clocks guarantees that all receivers must be in their next window. A receiver with a fast clock may have actually seen 10,012 clocks if the synch pulse transmitter has a slow clock. Since the synch pulse was received 12 clock cycles into the synch pulse window, the chip would delay for 12 clock cycles. Another receiver could seen 10,006 clocks and lock down for 6 clock cycles at the end of the synch pulse window. In both cases, each source ran 10,100 clock cycles.

When a port card or fabric is not present or has just been inserted and either of them is supposed to be driving the inputs of a receive synchronizer, the writing of data to the particular input FIFO will be inhibited since the input clock will not be present or unstable and the status of the data lines will be unknown. When the port card or fabric is inserted, software must come in and enable the input to the byte lane to allow data from that source to be enabled. Writes to the input FIFO will be enabled. It is assumed that, the enable signal will be asserted after the data, routeword and clock from the port card or fabric are stable.

At a system level, there will be a primary and secondary sync pulse transmitter residing on two separate fabrics. There will also be a sync pulse receiver on each fabric and blade. This can be seen in FIG. 5. A primary sync pulse transmitters will be a free-running sync pulse generator and a secondary sync pulse transmitter will synchronize its sync pulse to the primary. The sync pulse receivers will receive both primary and secondary sync pulses and based on an error checking algorithm, will select the correct sync pulse to forward on to the ASICs residing on that board. The sync pulse receiver will guarantee that a sync pulse is only forwarded to the rest of the board if the sync pulse from the sync pulse transmitters falls within its own sequence "0" count. For example, the sync pulse receiver and an Unstriper ASIC will both reside on the same Blade. The sync pulse receiver and the receive synchronizer in the Unstriper will be clocked from the same crystal oscillator, so no clock drift should be present between the clocks used to increment the internal sequence counters. The receive synchronizer will require that the sync pulse it receives will always reside in the "0" count window.

Figure 5:
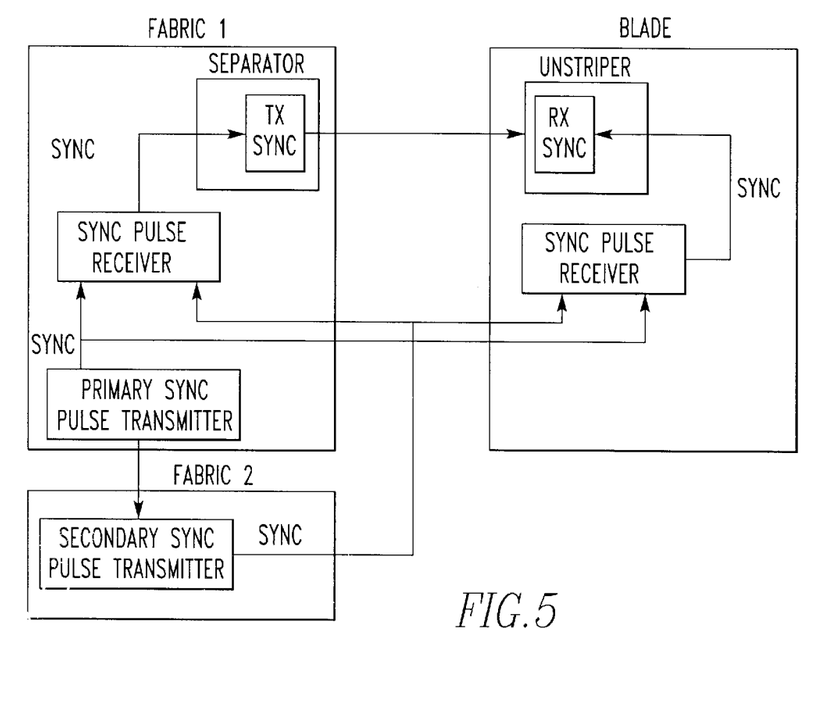
FIG. 5 is a schematic representation of sync pulse distribution.

If the sync pulse receiver determines that the primary sync pulse transmitter is out of sync, it will switch over to the secondary sync pulse transmitter source. The secondary sync pulse transmitter will also determine that the primary sync pulse transmitter is out of sync and will start generating its own sync pulse independently of the primary sync pulse transmitter. This is the secondary sync pulse transmitter's primary mode of operation. If the sync pulse receiver determines that the primary sync pulse transmitter has become in sync once again, it will switch to the primary side. The secondary sync pulse transmitter will also determine that the primary sync pulse transmitter has become in sync once again and will switch back to a secondary mode. In the secondary mode, it will sync up its own sync pulse to the primary sync pulse. The sync pulse receiver will have less tolerance in its sync pulse filtering mechanism than the secondary sync pulse transmitter. The sync pulse receiver will switch over more quickly than the secondary sync pulse transmitter. This is done to ensure that all receiver synchronizers will have switched over to using the secondary sync pulse transmitter source before the secondary sync pulse transmitter switches over to a primary mode.

FIG. 5 shows sync pulse distribution.

In order to lockdown the backplane transmission from a fabric by the number of clock cycles indicated in the sync calculation, the entire fabric must effectively freeze for that many clock cycles to ensure that the same enqueuing and dequeueing decisions stay in sync. This requires support in each of the fabric ASICs. Lockdown stops all functionality, including special functions like queue resynch.

The sync signal from the synch pulse receiver is distributed to all ASICs. Each fabric ASIC contains a counter in the core clock domain that counts clock cycles between global sync pulses. After the sync pulse is received, each ASIC calculates the number of clock cycles it is fast. Because the global sync is not transferred with its own clock, the calculated lockdown cycle value may not be the same for all ASICs on the same fabric. This difference is accounted for by keeping all interface FIFOs at a depth where they can tolerate the maximum skew of lockdown counts.

Lockdown cycles on all chips are always inserted at the same logical point relative to the beginning of the last sequence of "useful" (non-lockdown) cycles. That is, every chip will always execute the same number of "useful" cycles between lockdown events, even though the number of lockdown cycles varies.

Lockdown may occur at different times on different chips. All fabric input FIFOs are initially set up such that lockdown can occur on either side of the FIFO first without the FIFO running dry or overflowing. On each chip-chip interface, there is a sync FIFO to account for lockdown cycles (as well as board trace lengths and clock skews). The transmitter signals lockdown while it is locked down. The receiver does not push during indicated cycles, and does not pop during its own lockdown. The FIFO depth will vary depending on which chip locks down first, but the variation is bounded by the maximum number of lockdown cycles. The number of lockdown cycles a particular chip sees during one global sync period may vary, but they will all have the same number of useful cycles. The total number of lockdown cycles each chip on a particular fabric sees will be the same, within a bounded tolerance.

The Aggregator core clock domain completely stops for the lockdown duration—all flops and memory hold their state. Input FIFOs are allowed to build up. Lockdown bus cycles are inserted in the output queues. Exactly when the core lockdown is executed is dictated by when DOUT_AG bus protocol allows lockdown cycles to be inserted. DOUT_AG lockdown cycles are indicated on the DestID bus.

The memory controller must lockdown all flops for the appropriate number of cycles. To reduce impact to the silicon area in the memory controller, a technique called propagated lockdown is used.

The on-fabric chip-to-chip synchronization is executed at every sync pulse. While some sync error detecting capability may exist in some of the ASICs, it is the Unstriper's job to detect fabric synchronization errors and to remove the offending fabric. The chip-to-chip synchronization is a cascaded function that is done before any packet flow is enabled on the fabric. The synchronization flows from the Aggregator to the Memory Controller, to the Separator, and back to the Memory Controller. After the system reset, the Aggregators wait for the first global sync signal. When received, each Aggregator transmits a local sync command (value 0x2) on the DestID bus to each Memory Controller.

The striping function assigns bits from incoming data streams to individual fabrics. Two items were optimized in deriving the striping assignment:

1. Backplane efficiency should be optimized for OC48 and OC192.
2. Backplane interconnection should not be significantly altered for OC192 operation.

These were traded of f against additional muxing legs for the striper and unstriper ASICs. Regardless of the optimization, the switch must have the same data format in the memory controller for both OC48 and OC192.

Backplane efficiency requires that minimal padding be added when forming the backplane busses. Given the 12 bit backplane bus for OC48 and the 48 bit backplane bus for OC192, an optimal assignment requires that the number of unused bits for a transfer to be equal to (number_of_bytes *8)/bus_width where "/" is integer division. For OC48, the bus can have 0, 4 or 8 unutilized bits. For OC192 the bus can have 0, 8, 16, 24, 32, or 40 unutilized bits.

This means that no bit can shift between 12 bit boundaries or else OC48 padding will not be optimal for certain packet lengths.

For OC192c, maximum bandwidth utilization means that each striper must receive the same number of bits (which implies bit interleaving into the stripers). When combined with the same backplane interconnection, this implies that in OC192c, each stripe must have exactly the correct number of bits come from each striper which has ¼ of the bits.

For the purpose of assigning data bits to fabrics, a 48 bit frame is used. Inside the striper is a FIFO which is written 32 bits wide at 80–100 MHz and read 24 bits wide at 125 MHz. Three 32 bit words will yield four 24 bit words. Each pair of 24 bit words is treated as a 48 bit frame. The assignments between bits and fabrics depends on the number of fabrics.

TABLE 11

| | | Bit striping function | | | | | | | | | | | |
|---|---|---|---|---|---|---|---|---|---|---|---|---|---|
| | | Fab 0 | Fab 1 | Fab 2 | Fab 3 | Fab 4 | Fab 5 | Fab 6 | Fab 7 | Fab 8 | Fab 9 | Fab 10 | Fab 11 |
| 1 fab | 0:11 | 0:11 | | | | | | | | | | | |
| | 12:23 | 12:23 | | | | | | | | | | | |
| | 24:35 | 24:35 | | | | | | | | | | | |
| | 36:47 | 36:47 | | | | | | | | | | | |
| 2 fab | 0:11 | 0, 2, 5, 7, 8, 10 | 1, 3, 4, 6, 9, 11 | | | | | | | | | | |
| | 12:23 | 13, 15, 16, 18, 21 | 12, 14, 17, 19, 20, 22 | | | | | | | | | | |
| | 24:35 | +24 to 0:11 | +24 to 0:11 | | | | | | | | | | |
| | 36:47 | +24 to 12:23 | +24 to 12:23 | | | | | | | | | | |
| 3 fab | 0:11 | 0, 3, 5, 10 | 2, 4, 7, 9 | 1, 6, 8, 11 | | | | | | | | | |
| | 12:23 | 15, 17, 22, 13 | 14, 16, 19, 21 | 13, 18, 20, 23 | | | | | | | | | |
| | 24:35 | +24 to 0:11 | +24 to 0:11 | +24 to 0:11 | | | | | | | | | |
| | 36:47 | +24 to 12:23 | +24 to 12:23 | +24 to 12:23 | | | | | | | | | |
| 4 fab | 0:11 | 0, 5, 10 | 3, 4, 9 | 2, 7, 8 | 1, 6, 11 | | | | | | | | |
| | 12:23 | 15, 16, 21 | 14, 19, 20 | 13, 18, 23 | 12, 17, 22 | | | | | | | | |
| | 24:35 | 26, 31, 32 | 25, 30, 35 | 24, 29, 34 | 27, 28, 33 | | | | | | | | |
| | 36:47 | 37, 42, 47 | 36, 41, 46 | 39, 40, 43 | 38, 43, 44 | | | | | | | | |
| 6 fab | 0:11 | 0, 11 | 1, 4 | 5, 8 | 2, 9 | 3, 6 | 7, 10 | | | | | | |
| | 12:23 | 14, 21 | 15, 18 | 19, 22 | 12, 23 | 13, 16 | 17, 20 | | | | | | |
| | 24:35 | +24 to 0:11 | | | | | | | | | | | |
| | 36:47 | +24 to 12:23 | | | | | | | | | | | |
| 12 fab | 0:11 | 0 | 4 | 8 | 1 | 5 | 9 | 2 | 6 | 10 | 3 | 7 | 11 |
| | 12:23 | 15 | 19 | 23 | 12 | 16 | 20 | 13 | 17 | 21 | 14 | 18 | 22 |
| | 24:35 | 26 | 30 | 34 | 27 | 31 | 35 | 24 | 28 | 32 | 25 | 29 | 33 |
| | 36:47 | 37 | 41 | 45 | 38 | 42 | 46 | 39 | 43 | 47 | 37 | 40 | 44 |

The following tables give the byte lanes which are read first in the aggregator and written to first in the separator. The four channels are notated A,B,C,D. The different fabrics have different read/write order of the channels to allow for all busses to be fully utilized.

One Fabric-40 G

The next table gives the interface read order for the aggregator.

| Fabric | 1st | 2nd | 3rd | 4th |
|---|---|---|---|---|
| 0 | A | B | C | D |
| Par | A | B | C | D |

Two Fabric-80 G

| Fabric | 1st | 2nd | 3rd | 4th |
|---|---|---|---|---|
| 0 | A | C | B | D |
| 1 | B | D | A | C |
| Par | A | C | B | D |

120 G

| Fabric | 1st | 2nd | 3rd | 4th |
|---|---|---|---|---|
| 0 | A | D | B | C |
| 1 | C | A | D | B |
| 2 | B | C | A | D |
| Par | A | D | B | C |

Three fabric-160 G

| Fabric | 1st | 2nd | 3rd | 4th |
|---|---|---|---|---|
| 0 | A | B | C | D |
| 1 | D | A | B | C |
| 2 | C | D | A | B |
| 3 | B | C | D | A |
| Par | A | B | C | D |

Siz fabric-240 G

| Fabric | 1st | 2nd | 3rd | 4th |
|--------|-----|-----|-----|-----|
| 0 | A | D | C | B |
| 1 | B | A | D | C |
| 2 | B | A | D | C |
| 3 | C | B | A | D |
| 4 | D | C | B | A |
| 5 | D | C | B | A |
| Par | A | C | D | B |

Twelve Fabric-480 G

| Fabric | 1st | 2nd | 3rd | 4th |
|--------|-----|-----|-----|-----|
| 0, 1, 2 | A | D | C | B |
| 3, 4, 5 | B | A | D | C |
| 6, 7, 8 | C | B | A | D |
| 9, 10, 11 | D | C | B | A |
| Par | A | B | C | D |

Interfaces to the gigabit transceivers will utilize the transceiver bus as a split bus with two separate routeword and data busses. The routeword bus will be a fixed size (2 bits for OC48 ingress, 4 bits for OC48 egress, 8 bits for OC192 ingress and 16 bits for OC192 egress), the data bus is a variable sized bus. The transmit order will always have routeword bits at fixed locations. Every striping configuration has one transceiver that it used to talk to a destination in all valid configurations. That transceiver will be used to send both routeword busses and to start sending the data.

The backplane interface is physically implemented using interfaces to the backplane transceivers. The bus for both ingress and egress is viewed as being composed of two halves, each with routeword data. The two bus halves may have information on separate packets if the first bus half ends a packet.

For example, an OC48 interface going to the fabrics locally speaking has 24 data bits and 2 routeword bits. This bus will be utilized acting as if it has 2×(12 bit data bus +1 bit routeword bus). The two bus halves are referred to as A and B. Bus A is the first data, followed by bus B. A packet can start on either bus A or B and end on either bus A or B.

In mapping data bits and routeword bits to transceiver bits, the bus bits are interleaved. This ensures that all transceivers should have the same valid/invalid status, even if the striping amount changes. Routewords should be interpreted with bus A appearing before bus B.

The bus A/Bus B concept closely corresponds to having interfaces between chips.

All backplane busses support fragmentation of data. The protocol used marks the last transfer (via the final segment bit in the routeword). All transfers which are not final segment need to utilize the entire bus width, even if that is not an even number of bytes. Any given packet must be striped to the same number of fabrics for all transfers of that packet. If the striping amount is updated in the striper during transmission of a packet, it will only update the striping at the beginning of the next packet.

Each transmitter on the ASICs will have the following I/O for each channel:

8 bit data bus, 1 bit clock, 1 bit control.

On the receive side, for channel the ASIC receives a receive clock, 8 bit data bus, 3 bit status bus.

The switch optimizes the transceivers by mapping a transmitter to between 1 and 3 backplane pairs and each receiver with between 1 and 3 backplane pairs. This allows only enough transmitters to support traffic needed in a configuration to be populated on the board while maintaining a complete set of backplane nets. The motivation for this optimization was to reduce the number of transceivers needed.

The optimization was done while still requiring that at any time, two different striping amounts must be supported in the gigabit transceivers. This allows traffic to be enqueued from a striping data to one fabric and a striper striping data to two fabrics at the same time.

Depending on the bus configuration, multiple channels may need to be concatenated together to form one larger bandwidth pipe (any time there is more than one transceiver in a logical connection). Although quad gbit transceivers can tie 4 channels together, this functionality is not used. Instead the receiving ASIC is responsible for synchronizing between the channels from one source. This is done in the same context as the generic synchronization algorithm.

The $8b/10b$ encoding/decoding in the gigabit transceivers allow a number of control events to be sent over the channel. The notation for these control events are K characters and they are numbered based on the encoded 10 bit value. Several of these K characters are used in the chipset. The K characters used and their functions are given in the table below.

TABLE 12

K Character usage

| K character | Function | Notes |
|-------------|----------|-------|
| 28.0 | Sync indication | Transmitted after lockdown cycles, treated as the prime synchronization event at the receivers |
| 28.1 | Lockdown | Transmitted during lockdown cycles on the backplane |
| 28.2 | Packet Abort | Transmitted to indicate the card is unable to finish the current packet. Current use is limited to a port card being pulled while transmitting traffic |
| 28.3 | Resynch window | Transmitted by the striper at the start of a synch window if a resynch will be contained in the current sync window |
| 28.4 | BP set | Transmitted by the striper if the bus is currently idle and the value of the bp bit must be set. |
| 28.5 | Idle | Indicates idle condition |
| 28.6 | BP clr | Transmitted by the striper if the bus is currently idle and the bp bit must be cleared. |

The switch has a variable number of data bits supported to each backplane channel depending on the striping configuration for a packet. Within a set of transceivers, data is filled in the following order: F[fabric]_[oc192 port number][oc48 port designation (a,b,c,d)][transceiver_number]

The chipset implements certain functions which are described here. Most of the functions mentioned here have support in multiple ASICs, so documenting them on an ASIC by ASIC basis does not give a clear understanding of the full scope of the functions required.

The switch chipset is architected to work with packets up to 64K+6 bytes long. On the ingress side of the switch, there are busses which are shared between multiple ports. For most packets, they are transmitted without any break from the start of packet to end of packet. However, this approach can lead to large delay variations for delay sensitive traffic. To allow delay sensitive traffic and long traffic to coexist on the same switch fabric, the concept of long packets is introduced. Basically long packets allow chunks of data to be sent to the queueing location, built up at the queueing location on a source basis and then added into the queue all at once when the end of the long packet is transferred. The definition of a long packet is based on the number of bits on each fabric.

If the switch is running in an environment where Ethernet MTU is maintained throughout the network, long packets will not be seen in a switch greater than 40 G in size.

A wide cache-line shared memory technique is used to store cells/packets in the port/priority queues. The shared memory stores cells/packets continuously so that there is virtually no fragmentation and bandwidth waste in the shared memory.

There exists multiple queues in the shared memory. They are per-destination and priority based. All cells/packets which have the same output priority and blade/channel ID are stored in the same queue. Cells are always dequeued from the head of the list and enqueued into the tail of the queue. Each cell/packet consists of a portion of the egress route word, a packet length, and variable-length packet data. Cell and packets are stored continuously, i.e., the memory controller itself does not recognize the boundaries of cells/packets for the unicast connections. The packet length is stored for MC packets.

The multicast port mask memory 64K×16-bit is used to store the destination port mask for the multicast connections, one entry (or multiple entries) per multicast VC. The port masks of the head multicast connections indicated by the multicast DestID FIFOs are stored internally for the scheduling reference. The port mask memory is retrieved when the port mask of head connection is cleaned and a new head connection is provided.

APS stands for a Automatic Protection Switching, which is a SONET redundancy standard. To support APS feature in the switch, two output ports on two different port cards send roughly the same traffic. The memory controllers maintain one set of queues for an APS port and send duplicate data to both output ports.

To support data duplication in the memory controller ASIC, each one of multiple unicast queues has a programmable APS bit. If the APS bit is set to one, a packet is dequeued to both output ports. If the APS bit is set to zero for a port, the unicast queue operates at the normal mode. If a port is configured as an APS slave, then it will read from the queues of the APS master port. For OC48 ports, the APS port is always on the same OC48 port on the adjacent port card.

The shared memory queues in the memory controllers among the fabrics might be out of sync (i.e., same queues among different memory controller ASICs have different depths) due to clock drifts or a newly inserted fabric. It is important to bring the fabric queues to the valid and sync states from any arbitrary states. It is also desirable not to drop cells for any recovery mechanism.

A resynch cell is broadcast to all fabrics (new and existing) to enter the resynch state. Fabrics will attempt to drain all of the traffic received before the resynch cell before queue resynch ends, but no traffic received after the resynch cell is drained until queue resynch ends. A queue resynch ends when one of two events happens:

1. A timer expires.
2. The amount of new traffic (traffic received after the resynch cell) exceeds a threshold.

At the end of queue resynch, all memory controllers will flush any left-over old traffic (traffic received before the queue resynch cell). The freeing operation is fast enough to guarantee that all memory controllers can fill all of memory no matter when the resynch state was entered.

Queue resynch impacts all 3 fabric ASICs. The aggregators must ensure that the FIFOs drain identically after a queue resynch cell. The memory controllers implement the queueing and dropping. The separators need to handle memory controllers dropping traffic and resetting the length parsing state machines when this happens. For details on support of queue resynch in individual ASICs, refer to the chip ADSs.

For the dequeue side, multicast connections have independent 32 tokens per port, each worth up 50-bit data or a complete packet. The head connection and its port mask of a higher priority queue is read out from the connection FIFO and the port mask memory every cycle. A complete packet is isolated from the multicast cache line based on the length field of the head connection. The head packet is sent to all its destination ports. The 8 queue drainers transmit the packet to the separators when there are non-zero multicast tokens are available for the ports. Next head connection will be processed only when the current head packet is sent out to all its ports.

Queue structure can be changed on fly through the fabric resynch cell where the number of priority per port field is used to indicate how many priority queues each port has. The stripper ASIC resides on the network blade.

The following words have reasonably specific meanings in the vocabulary of the switch. Many are mentioned elsewhere, but this is an attempt to bring them together in one place with definitions.

TABLE 23

| Word | Meaning |
| --- | --- |
| APS | Automatic Protection Switching. A sonet/sdh standard for implementing redundancy on physical links. For the switch, APS is used to also recover from any detected port card failures. |
| Backplane synch | A generic term referring either to the general process the switch boards use to account for varying transport delays between boards and clock drift or to the logic which implements the TX/RX functionality required for the switch ASICs to account for varying transport delays and clock drifts. |
| BIB | The switch input bus. The bus which is used to pass data to the striper(s). See also BOB |
| Blade | Another term used for a port card. References to blades should have been eliminated from this document, but some may persist. |
| BOB | The switch output bus. The output bus from the striper which connects to the egress memory controller. See also BIB. |
| Egress Routeword | This is the routeword which is supplied to the chip after the unstriper. From an internal chipset perspective, the egress routeword is treated as data. See also fabric routeword. |
| Fabric Routeword | Routeword used by the fabric to determine the output queue. This routeword is not passed outside the unstriper. A significant portion of this routeword is blown away in the fabrics. |
| Freeze | Having logic maintain its values during lock-down cycles. |

TABLE 23-continued

| Word | Meaning |
| --- | --- |
| Lock-down | Period of time where the fabric effectively stops performing any work to compensate for clock drift. If the backplane synchronization logic determines that a fabric is 8 clock cycles fast, the fabric will lock down for 8 clocks. |
| Queue Resynch | A queue resynch is a series of steps executed to ensure that the logical state of all fabric queues for all ports is identical at one logical point in time. Queue resynch is not tied to backplane resynch (including lock-down) in any fashion, except that a lock-down can occur during a queue resynch. |
| SIB | Striped input bus. A largely obsolete term used to describe the output bus from the striper and input bus to the aggregator. |
| SOB | The first is striped output bus, which is the output bus of the fabric and the input bus of the agg. See also SIB. |
| Sync | Depends heavily on context. Related terms are queue resynch, lock-down, freeze, and backplane sync. |
| Wacking | The implicit bit steering which occurs in the OC192 ingress stage since data is bit interleaved among stripers. This bit steering is reversed by the aggregators. |

Figure 6:
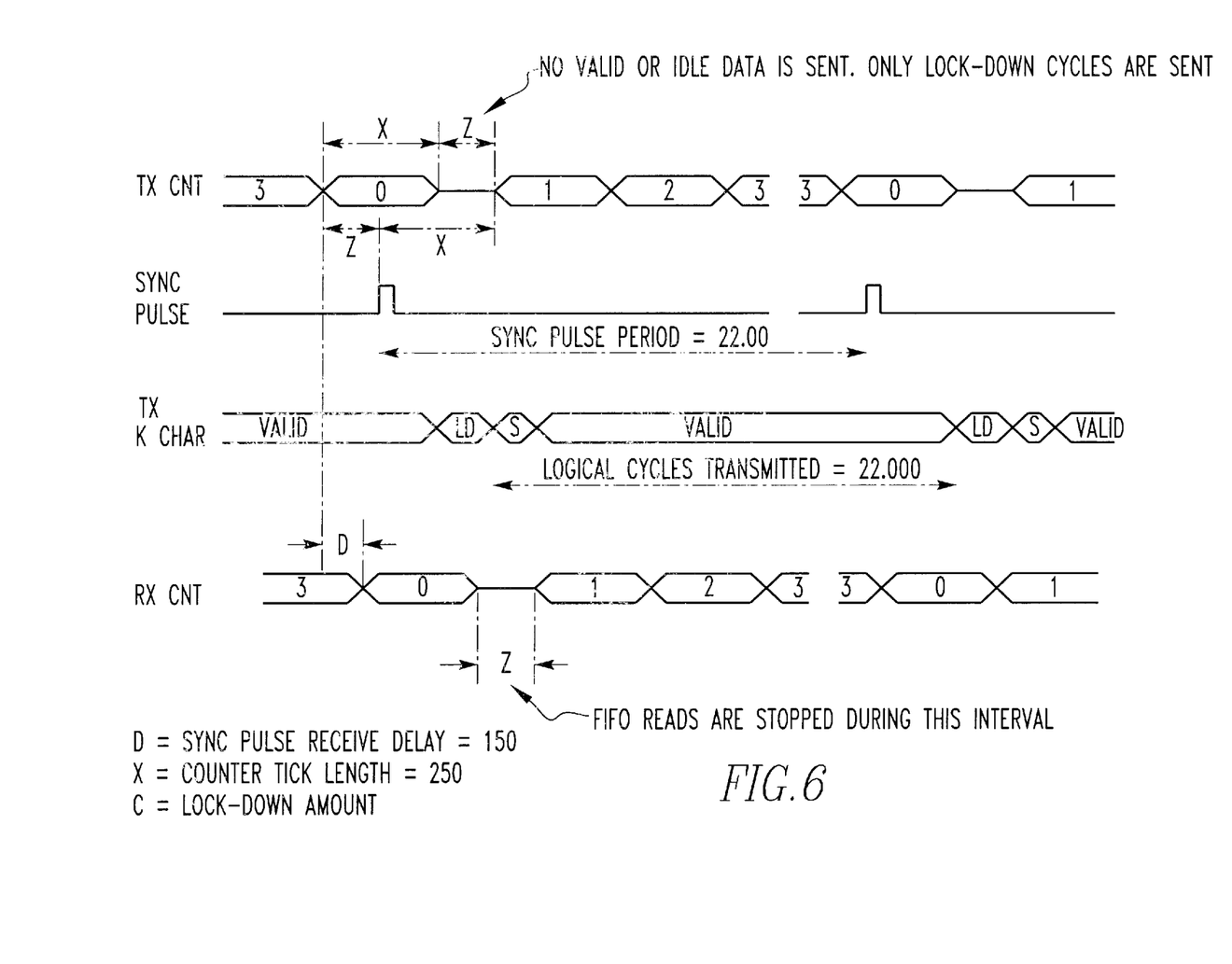
FIG. 6 is a schematic representation regarding the relationship between transmit and receive sequence counters for the separator and unstriper, respectively.

The relationship between the transmit and receive counters can be seen in FIG. 6.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A switch of a network connected to a switch control processor comprising:

port cards which receive packets from and send packets to the network;

a switch control processor for providing control information; and fabrics for switching the packets, the fabrics receiving control information from the switch control processor but all the fabrics only implementing the control information at a same logical time when each fabric receives a control initiation signal from one of the port cards, each respective fabric continuously operating on packets before, during and after each respective fabric receives the control initiation signal, each fabric enters a queue resynch state where all packet fragments received by the fabric before the queue resynch state is entered by the fabrics are dequeued, and any packet fragments received by the fabric after the queue resynch state is entered are dequeued only after a prespecified queue resynch time has elapsed, the fabrics connected to the switch control processor and the port cards, the fabrics receiving respective packet fragments from the port cards.

2. A switch as described in claim 1 wherein each port card includes a striper which sends to each fabric a respective fragment of each packet.

3. A switch as described in claim 2 wherein all the fabrics are in sync with each other.

4. A switch as described in claim 3 wherein each fabric has an aggregator which receives the packet fragments from the striper, a memory controller in which the packet fragments received by the aggregator are stored, and a separator which sends the packet fragments in the memory controller to the port card.

5. A switch as described in claim 4 wherein each fabric becomes in sync with all the other fabrics after the control initiation signal is received and by bringing the aggregator, then the memory controller and next the separator of each fabric, respectively, in sync.

6. A switch as described in claim 5 wherein the control initiation signal is sent in a queue resynch packet.

7. A method for switching packets comprising the steps of:

receiving packets at a port card of a switch from a network;

sending fragments of each packet to fabrics of the switch;

distributing control information from a switch control processor to the fabrics of the switch as the port card continues to receive packets;

receiving a control initiation signal from the switch control processor through the network at the port card;

sending the control initiation signal from the port card to the fabrics;

implementing the control information at each fabric only after the respective fabric receives the control initiation signal so all the fabrics implement the control information at the same time, and entering a queue resynch state by each fabric when the respective fabric implements the control information; and dequeueing any packet fragments received by the fabric before any new packet fragments received by the fabric after the fabric has entered the resynch state are dequeued.

8. A method as described in claim 7 wherein the dequeueing step includes the step of dequeueing any new packets only after a prespecified queue resynch time has passed or the new packet fragments received exceed a preset queue resynch threshold of packet fragments.

9. A method as described in claim 8 wherein before the receiving control information step, there is the step of adding a new fabric to the fabrics of the switch; and the receiving the control information step includes the step of receiving the control information which includes information regarding the initiation of new fabric.

10. A method as described in claim 9, wherein the sending fragments of the packets step includes the step of sending fragments of the packets with a striper of the port card to an aggregator of each fabric.

11. A method as described in claim 10 the entering step includes the step of bringing in sync the aggregator, then a memory controller and next a separator of each fabric, respectively.

12. A method as described in claim 11 wherein the receiving control initiation signal step includes the step of receiving a queue resynch packet having the control initiation signal, which is inserted with other packets being sent.

13. A switch of a network connected to a switch control processor comprising:

port cards which receive packets from and send packets to the network, each port card includes a striper;

a switch control processor for providing control information; and fabrics for switching the packets, the fabrics receiving control information from the switch control processor but all the fabrics only implementing the control information at a same logical time when each fabric receives a control initiation signal from one of the port cards, each respective fabric continuously operating on packets before, during and after each respective fabric receives the control initiation signal, the striper sends to each fabric a respective fragment of each packet as a stripe and also generates a parity stripe for error detection and correction, the fabrics connected to the switch control processor and the port cards.

14. A method for switching packets comprising the steps of:

receiving packets at a port card of a switch from a network;

sending fragments of each packet to fabrics of the switch as stripes and producing a parity stripe for error detection and correction;

distributing control information from a switch control processor to the fabrics of the switch as the port card continues to receive packets;

receiving a control initiation signal from the switch control processor through the network at the port card;

sending the control initiation signal from the port card to the fabrics; and implementing the control information at each fabric only after the respective fabric receives the control initiation signal so all the fabrics implement the control information at the same time.

15. A switch as described in claim 13 wherein each fabric enters a queue resynch state where all packet fragments received by the fabric before the queue resynch state is entered by the fabrics are dequeued, and any packet fragments received by the fabric after the queue resynch state is entered are dequeued only after a prespecified queue resynch time has elapsed.

16. A method as described in claim 14 wherein the implementing step includes the step of entering a queue resynch state by each fabric when the respective fabric implements the control information.

17. A method as described in claim 16 including after the entering step, there is the step of dequeueing any packet fragments received by the fabric before any new packet fragments received by the fabric after the fabric has entered the resynch state are dequeued.

\* \* \* \* \*